United States Patent [19]

Chiba et al.

[11] 3,736,580

[45] May 29, 1973

[54] PLAY BACK - MACHINE CONTROL (POSITION INFORMATION STORAGE AND REPRODUCTION DEVICE)

[75] Inventors: Jiro Chiba, Koohoku-ku, Yokohama-shi, Kanagawa-ken; Tadaaki Kanazaki, Komae-shi, Tokyo, both of Japan

[73] Assignee: Tokyo Seimitisu Sokki Kabushiki Kaisha, Kawasaki-shi, Kanagawa-ken, Japan

[22] Filed: Apr. 24, 1972

[21] Appl. No.: 246,787

Related U.S. Application Data

[63] Continuation-in-part of Ser. No. 154,630, June 18, 1971, abandoned, which is a continuation of Ser. No. 836,818, June 26, 1969, abandoned.

[52] U.S. Cl. ........340/174.1 J, 33/1 M, 340/174.1 A, 340/347 P, 346/74 M

[51] Int. Cl. ..........................................H03k 13/02

[58] Field of Search .................340/174.1 A, 174.1 J, 340/174.1 L, 347 P; 33/1 M; 346/74 M, 33 MC

[56] References Cited

UNITED STATES PATENTS 3,166,846 1/1965 Pasco et al...........................33/1 M 3,473,157 10/1969 Little et al.............................33/1 M 3,505,670 4/1970 Cone et al.........................340/347 P

*Primary Examiner*—Terrell W. Fears

*Attorney*—John W. Malley, Paul N. Kokulis, Allen Kirkpatrick et al.

[57] ABSTRACT

A control unit for storing the information of the coordinates corresponding to many-dimensional motion of a moving point and for reproducing this motion by the stored information wherein pulse trains corresponding to the information data of each coordinate are counted by a reversible counter during a predetermined time in such a manner that the number of pulses in these trains is represented in a binary coded form so as to constitute data blocks including each one binary digit showing the forward or reverse direction of the motion, data blocks thus formed are sequentially stored in series into a storage device (preferably a rotating magnetic drum or disk) and the stored data blocks are read out one by one through the output gates of a linear interpolation circuit, so that the reproduced pulse trains may approximate the original motion by a line-segment motion.

15 Claims, 9 Drawing Figures

PLAY BACK - MACHINE CONTROL (POSITION INFORMATION STORAGE AND REPRODUCTION DEVICE)

This is a continuation-in-part application of our now abandoned streamlined continuation application of Ser. No. 154,630 filed June 18, 1971 in connection with our patent application of Ser. No. 836,818 filed June 26, 1969 also abandoned.

BACKGROUND AND SUMMARY OF THE INVENTION

The present invention relates generally to play back - machine control, more particularly a position information storage and reproduction device for a numerically control system.

The numerically control system is widely used in various machines including the machine tools for effecting automatically operations. Because of complexity of the operations, these machines are automatically programmed by electronic computors. However, it generally occurs often that a skilled operator himself must demonstrate an example for operation of a machine because of too much complicated operation.

The primary object of the present invention is therefore to provide a novel position information storage and reproduction device where the example of operation is measured continuously and automatically by a digital detector so that date by this measurement may be stored in the storage device and the operations of the machine after said initial operation may be made by reproducing these stored date.

A second object of the present invention is to provide a novel position information storage and reproduction device which may store therein instruction pulse trains given from the electronic computers or the numerically control system and may be moved easily to another place where the stored instruction pulse trains are reproduced, thereby attaining the similar effect as in the case of the numerically control system.

Generally when the numerically control system is desired to be operated in several places, each numerically control system must be installed in each place and an input into the system must be an instruction tape formed by an electonic computor. However, according to the present invention the effects by the expensive numerically control system may be also attained by an inexpensive device. Thus, many advantages may accrue when the device is used as an auxiliary system to the numerically control one.

To accomplish such effects, there has been so far proposed the use of a magnetic tape recorder, but satisfactory results have not been obtained in practice because the service life of the tape or the magnetic head is relatively short; omission of some pulses is caused when using the recorder at a job site contaminated with much dust of magnetic materials, and the instantaneous starting or stopping of the recorder is very difficult.

The present invention contemplates to eliminate such defects as described above by use of a magnetic drum or disk, instead of the magnetic tape. The magnetic drum or disk is widely used as a highly reliable storage device, but its use for elimination of these defects has been so far limited due to a smaller memory capacity thereof. However, according to the present invention the pulse trains are stored in the form of binary digits, thereby increasing remarkably an apparent memory capacity of the magnetic drum or disk.

The above and other objects, features and advantages of the present invention will become clearer from the following description of illustrative embodiments taken in connection with the accompanying drawings.

DETAILED DESCRIPTION OF THE PREFERRED EMBODIMENTS

The present invention will be described with reference to one embodiment thereof for drawing a two-dimensional curve to store its position data and for re-drawing or re-generating the curve by reproducing these data.

Figure 1:
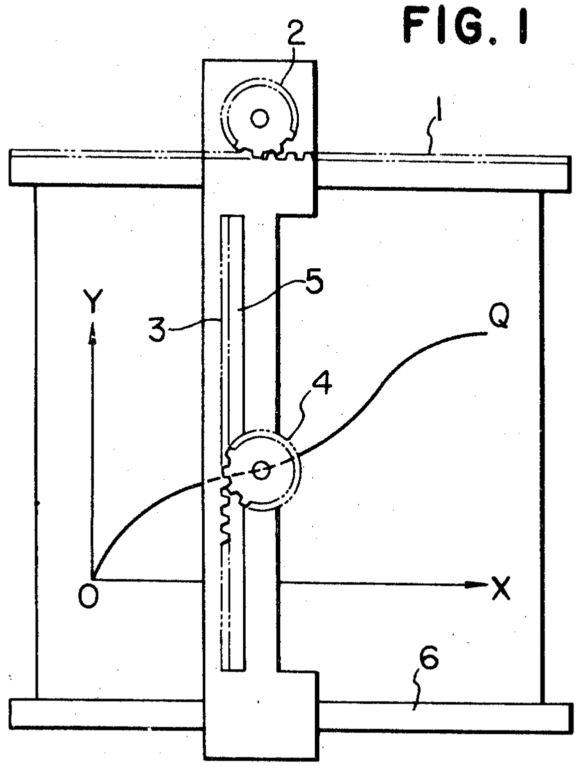
FIG. 1 shows a mechanism for converting the two-dimensional motion (generally many-dimensional motion) into X and Y coordinate pulse trains according to the present invention.
Figure 2:
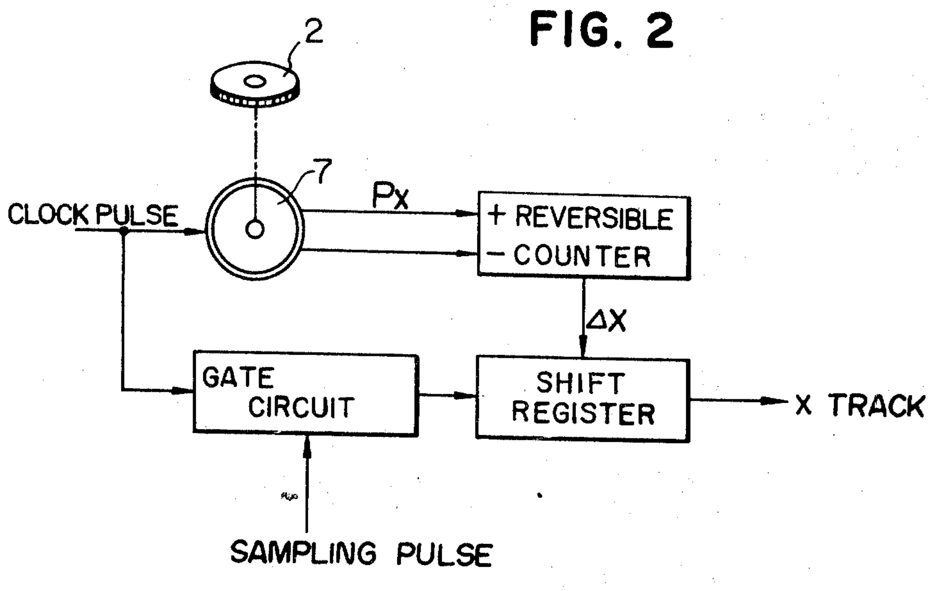
FIG. 2 is a block diagram of a circuit for converting the pulse trains generated by the mechanism shown in FIG. 1 into binary digits so as to be stored in one track of a magnetic drum or disk.

In FIG. 1 which illustrates schematically a mechanism in accordance with the present invention for transducing or converting the motion of a pen (not shown) fixed to the center of a pinion 4 on the lower side thereof along a curve $\overline{0Q}$ into pulse trains, the motion of the pen in the X direction is first translated into the rotation of a pinion 2 in mesh with a rack 1 while that in the Y direction into the rotation of the pinion 4 in mesh with a rack 3. Reference numerals 5 and 6 designate guide rails for moving the pen in the X and Y directions respectively. A pulse generator (the reference numeral 7 in FIG. 2) is attached to a rotary shaft of each pinion 2,4, so that the two-dimensional motion of the pen may be converted by the rotation of the pinions into a pair of Px and Py pulse trains. The pulse generator is constructed in such a manner that one pulse may be generated incrementally every displacement of for example 0.1 mm in the X or Y direction of the pen. It should be noted that pulses are derived from the two different terminals of the pulse generator, depending upon the forward or reverse direction of the movement. These puses from the pulse generator 7 (which is for generating pulses in the X direction, but the same is also true in the Y direction) are applied to a binary reversible counter. That is, when clock pulses from a storage device such as a magnetic drum or disk (not shown) are applied to the pulse generator 7, some of them are derived as an output pulse train $\overline{Px}$, depending upon an angular displacement $\theta x$ (not shown) of the rotary shaft in the pulse generator which is directly coupled to the pinion 2, and then are applied to the binary reversible counter. When the counter has $(n + 1)$ stages, the totally counted number of pulses may be represented by a binary number having $n$ digits. The remaining one stage is used for designating a positive or negative sign of this numerically represented content $\Delta x$. The content including the sign is registered in a shift register and is written or stored into the track of a storage device by shifting the content by clock pulses sampled at a predetermined time interval as will be described hereinafter in more detail. That is, a gate circuit in FIG. 2 is opened by properly selected sampling pulses so that the content in the shift register is shifted toward the right by each clock pulse, thereby writing the content into the X track. The magnetic drum will be used in this embodiment as a storage device, but the magnetic disk may of course be used.

Let it be assumed that the maximum stroke of the pen in both of the X and Y directions be 1,000 mm; the maximum speed be 1,000 mm/sec.; and one pulse be generated for every displacement of 0.1 mm. Then the $Px$ pulse train contains $10^4$ pulses/sec. in maximum. Further, let it be assumed that these pulses be sampled per 10 m sec. Then the Px pulse train may include 100 pulses/sec. in maximum within one sampling period or interval. Therefore, the shift register shown in FIG. 2 may accomodate these pulses sufficiently, if it has therein 7 stages ($2^7 = 128$) for holding a group of binary digits and one more stage for holding a binary digit representing the positive or negative sign of this group.

On the assumption that the clock pulse from the magnetic drum is $200 \times 10^3$ pulses/sec. ($5\mu$sec per pulse), a time required for one writing-shifting is 40 $\mu$ sec. ($5\mu$sec. $\times$ 8). In the embodiment described above, even when the next Px pulse train arrives at the reversible counter during the writing, this pulse train has only one pulse at the most (an instruction input period being 100 $\mu$ sec. at the maximum velocity of 1,000 mm/sec.) so that such a pulse train may be stored in a relatively simple auxiliary storage circuit with the counter. Generally, even when a $Px$ pulse train having more than one pulse arrives at the reversible counter during the writing, it may be stored in a suitable auxiliary storage circuit (not shown) within the counter so that the operation is not disadvantageously influenced.

Upon completion of writing the information of one block, the reversible counter and the shifting register may be cleared out for the next sampling. It is of course possible to use a circuit combining the reversible counter and the shifting register (The reversible counter in FIGS. 6 to 9 is of this type having a shift-function).

Figure 3:
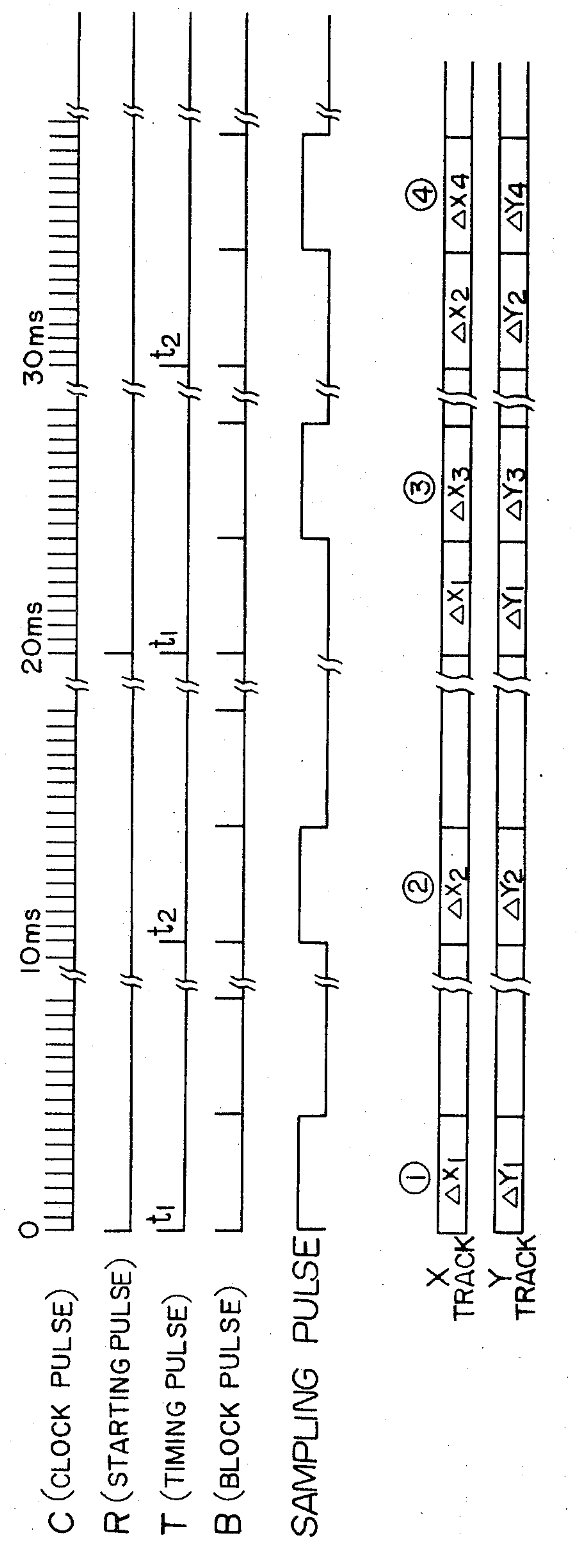
FIG. 3 shows the relation of information data stored in the tracks of the magnetic drum or disk.

FIG. 3 shows the relation among various informations stored upon the magnetic drum or disk, which retates at a speed of 50 rotation per sec. (20 m sec. per rotation) in this embodiment. Hereinafter, the storage device will be referred to the magnetic drum for the convenience of explanation. The reference character C designates clock pulses with a frequency of $200 \times 10^3$ pulses /sec. (5 $\mu$ sec. per pulse) and 4,000 bits come to have been stored in one track. R designates starting pulses indicating reference points to the rotation of the magnetic drum, while T timing pulses for determining a minimum sampling interval or period whose number is dependent upon the revolution period of the magnetic drum and a required minimum sampling time which are written into the track prior to block pulses to be described below. In the present embodiment, when the minimum sampling time is 10 m sec., two timing pulses $t_1$ and $t_2$ may be written in at an equidistantly spaced-apart interval. B designates block pulses representing each boundary of adjacent blocks. In this embodiment, as one block consists of 8 digits including one digit for a sign, one block pulse is written in every 8 clock pulses. It should be noted that a 8 bit counter may be used instead of the track of the magnetic drum.

A writing sequence is as follows: First, the numerical informations $\Delta X_1$ and $\Delta Y_1$ of a first block designated by ① are written upon the magnetic drum in the X and Y tracks shown in FIG. 3 when a timing pulse $t_1$ arrives. Next after 10 m sec. when a timing pulse $t_2$ arrives, a second block ② is written. The third block ③ is written when a first block pulse after the timing pulse $t_1$ arrives. The fourth block ④ is written when a first block pulse after the timing pulse $t_2$ arrives, and so on. Thus, the writing are effected every 10,040 $\mu$ sec. (= 10 m sec. + 5 $\mu$ sec. $\times$ 8) and 500 block informations (4,000/8) may be stored in each of the X and Y tracks.

This corresponds to approximately 50,000 (100 $\times$ 500) pulses in the $Px$ or $Py$ pulse train. Generally, information blocks written in the magnetic drum will correspond to $4{,}000/(n+1) \times 2^n$ pulses where $n$ is the number of stages in the reversible counter. It should be noted that the number of pulses may be remarkably increased as the number of the stages is increased. When one track is filled up to a maximum extent, the information may be stored into another track in the same manner as described hereinabove. This means that the capacity of the magnetic drum may be utilized efficiently as compared with a one bit or one pulse type storage device such as the magnetic tape.

The present invention has been described above by way of the minimum sampling period equal to half a revolution of the magnetic drum. However, man may set the period to a shorter one. Besides, when the movement of the pen is slow, the data storage may be effected in the same manner as described hereinabove once every one of more rotations of the magnetic drum by counting the R or T pulses. In either case, the writing process is completely regular so that the sampling puses may be suitably agenerated for controlling the gate circuit shown in FIG. 2 by a suitable combination of the circuits for counting the R,T and B pulses. Next, how to reconstruct the stored data will be described hereinafter.

Figure 4:
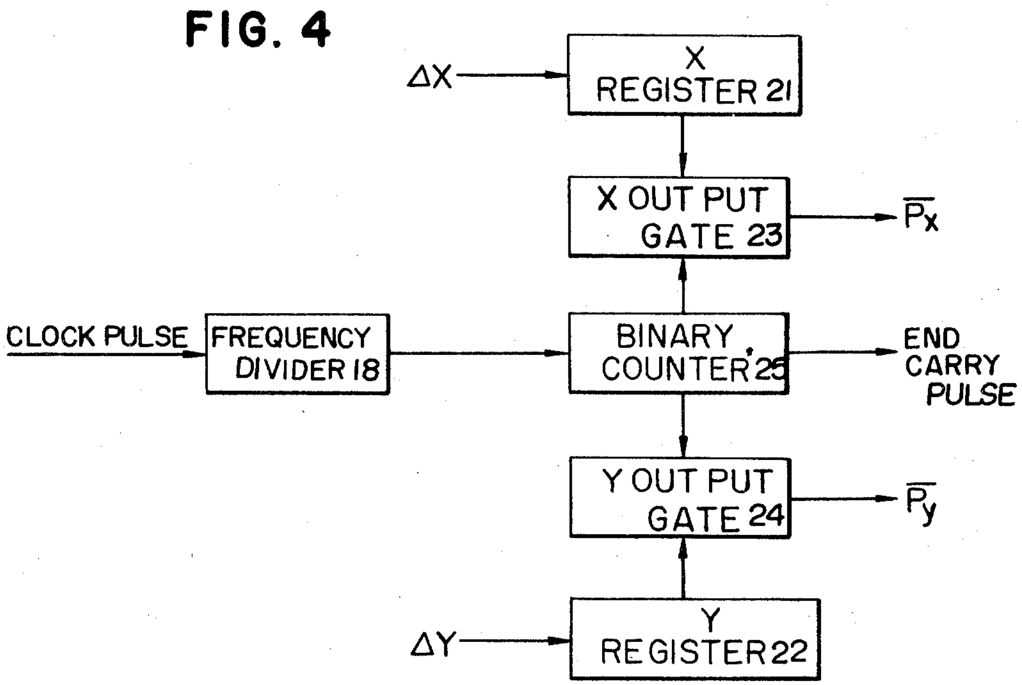
FIG. 4 is a schematic block diagram of a circuit for reproducing the stored data into the pulse trains corresponding to a line-segment motion for approximation of the initial or original motion.

FIG. 4 shows an MIT (Massachusetts Institute of Technology) type pulse distributor well known in the art for reconstructing the stored data, thereby reproducing the motion of the pen. This is called also "a linear interpolator", and comprises a frequency divider 18, a binary counter 25, output gates 23,24 and X, Y registers 21,22 for controlling these output gates. The numerical informations stored in the X and Y tracks of the magnetic drum are read out from the first block in synchronism with the timing of the writing and then applied to the X and Y registers 21,22 respectively. These registers open gates (not shown) within the X, Y output gates 23,24, according 23,24, the numerical informations to be read out while simultaneously the binary counter 25 which receives clock pulses from the drum, operates to derive from the X,Y output gates 22,24, $\overline{Px}$ and $\overline{Py}$ pulse trains corresponding to the above informations. However, since the clock pulses stored in the drum have a relatively high frequency, they must be divided into a suitable frequency by the frequency divider 18. In this embodiment utilizing the sampling period of 10 m sec., the frequency of the clock pulses is divided into the order of about 10 Hz. The frequency division may be effected by properly setting a dial (not shown), but suitable clock pulses may be stored on one of the tracks in the magnetic drum, correspondingly to the sampling period on the writing.

Figure 5:
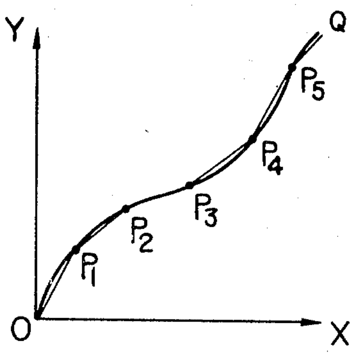
FIG. 5 is a view showing the relation between the initial or original motion and the reproduced line-segment motion.

The output $\overline{Px}$ and $\overline{Py}$ pulse trains correspond to vectors having the components of the numerical values $\Delta X_1$ and $\Delta Y_1$ in the first block as is well known in the art. When the $\overline{Px}$ and $\overline{Py}$ pulse trains are applied to a suitable mechanism, the initial motion or curve as shown in FIG. 1 may be approximately reproduced with short linear segments $\overline{op_1}$, $\overline{p_1p_2}$, . . . as shown in FIG. 5. This process is similar to the ordinary numerically controlled shaping method with the linear segment approximation. The sampling period and the number of stages of the reversible counter in FIG. 2 may be determined in consideration of a velocity of the initial motion (that for following the initial curve as shown in FIG. 1) and a desired accuracy.

As shown in FIG. 4, when $\overline{Px}$ and $\overline{PY}$ of the first block have been derived from the output gates 23,24, an end carry pulse is derived from the binary counter 25 so that the $\Delta X_2$ and $\Delta Y_2$ of the second block may be applied to the X and Y registers 21,22 respectively upon emergence of the end carry pulse. The velocity of the motion of the mechanism in reproducing may be arbitrarily varied independently of the velocity of the initial motion by varying a division rate of the frequency divider 18.

Figure 6:
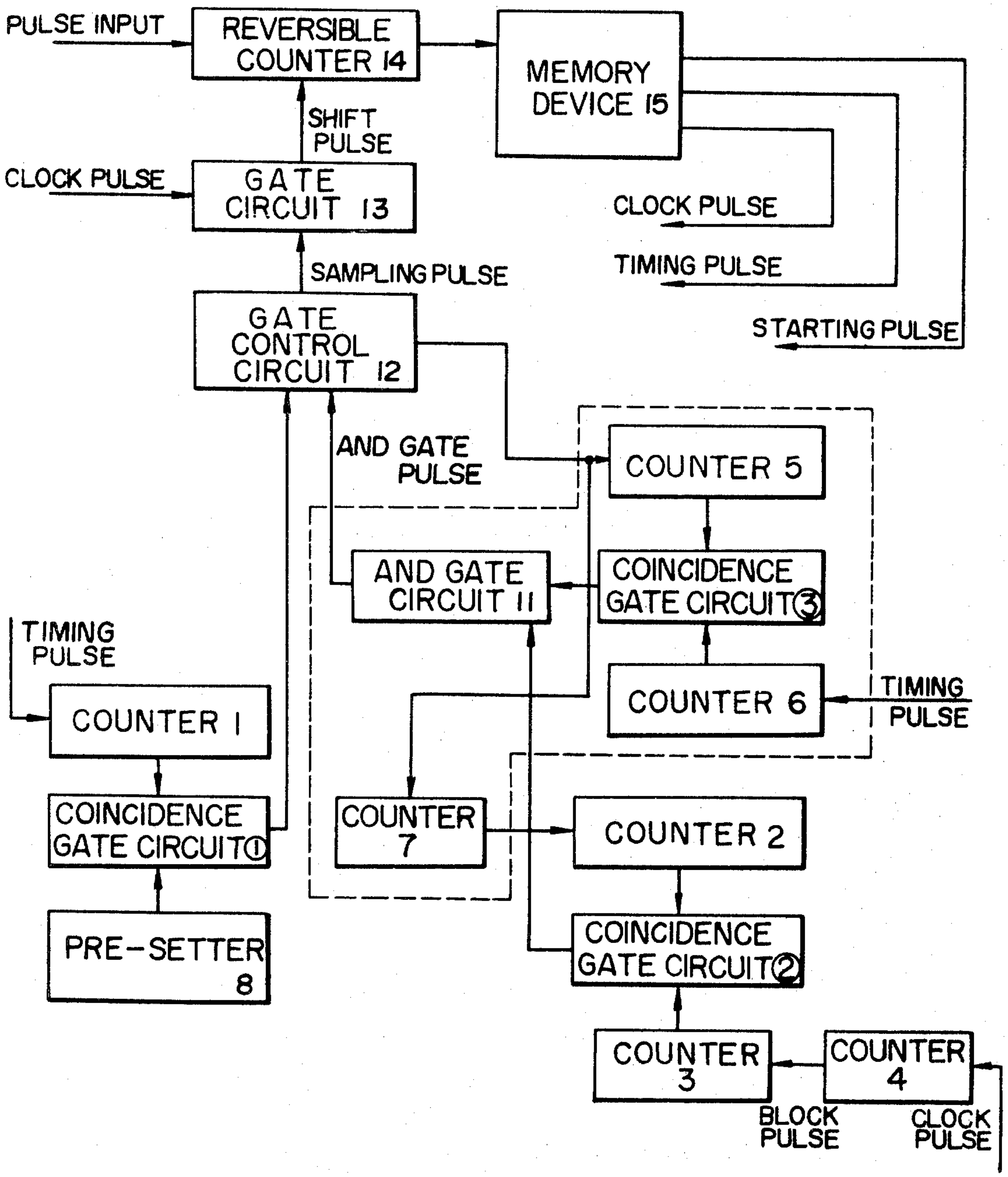
FIG. 6 is a block diagram of an information storage system in the device of the present invention.

In FIG. 6 will be herein explained a block diagram of a circuit for generating sampling pulses in the gate control circuit 12.

The timing pulse T stored in the memory device 15 is read out and applied to the counter 1. When the counter 1 counts pulses set by the presetter 8 to a desired sampling period, the coincidence circuit ① is opened so that coincidence pulses are applied to the gate control circuit 12. In this circuit pulses are newly generated every completion of a writing in the drum as mentioned later and are further applied to the counter 7 and the counter 5. The counter 7 has the same capacity (in this embodiment, two) as the number of the timing pulses T stored in the drum and applies a pulse to the counter 2 whenever it counts two pulses from the gate control circuit 12.

The clock pulses C read out from the memory device 15 are applied to the counter 4 which operates as a word counter to count the number of bits of one word. That is, in the embodiment described relative to FIG. 3, whenever 8 pulses are counted, one block pulse B is generated and applied to the counter 3. The counter 3 counts this block pulse and when the content of the counter 3 becomes equal or coincident with that of the counter 2, a coincidence pulse is generated from the coincidence gate circuit ②. It should be noted that the counter 3 and the counter 4 are reset by the timing pulses. The capacity of the counters 5 and 6 are equal to the number of T pulses stored in the drum. The counter 5 counts the pulses from the gate control circuit 12 while the counter 6 T pulses, when the content of both counters is coincident, a coincidence pulse is generated from the coincidence gate circuit ③. The counter 6 is adapted to be reset by the pulses every one revolution of the drum. Furthermore, the counters 5 and 6 are the circuits for selecting either of the sections of the drum divided by the T pulses (in the embodiment described relative to FIG. 3, the two sections divided by the timing pulses $t_1$ and $t_2$) while the counters 2 and 3 for selecting blocks in said sections. An and gate pulse on the outputs from these coincidence gate circuits ② and ③ is applied through the and gate circuit 11 to the gate control circuit 12. This pulse is derived from the circuit 12 as a sampling pulse after arrival of the coincidence pulse① thereat. When the gate circuit 13 is opened by the sampling pulse, the clock pulse from the drum becomes a required shift pulse so that the content of the reversible counter 14 which counts input pulses in binary digits is shifted to the memory device 15. In this case, a writing is effected.

Figure 7:
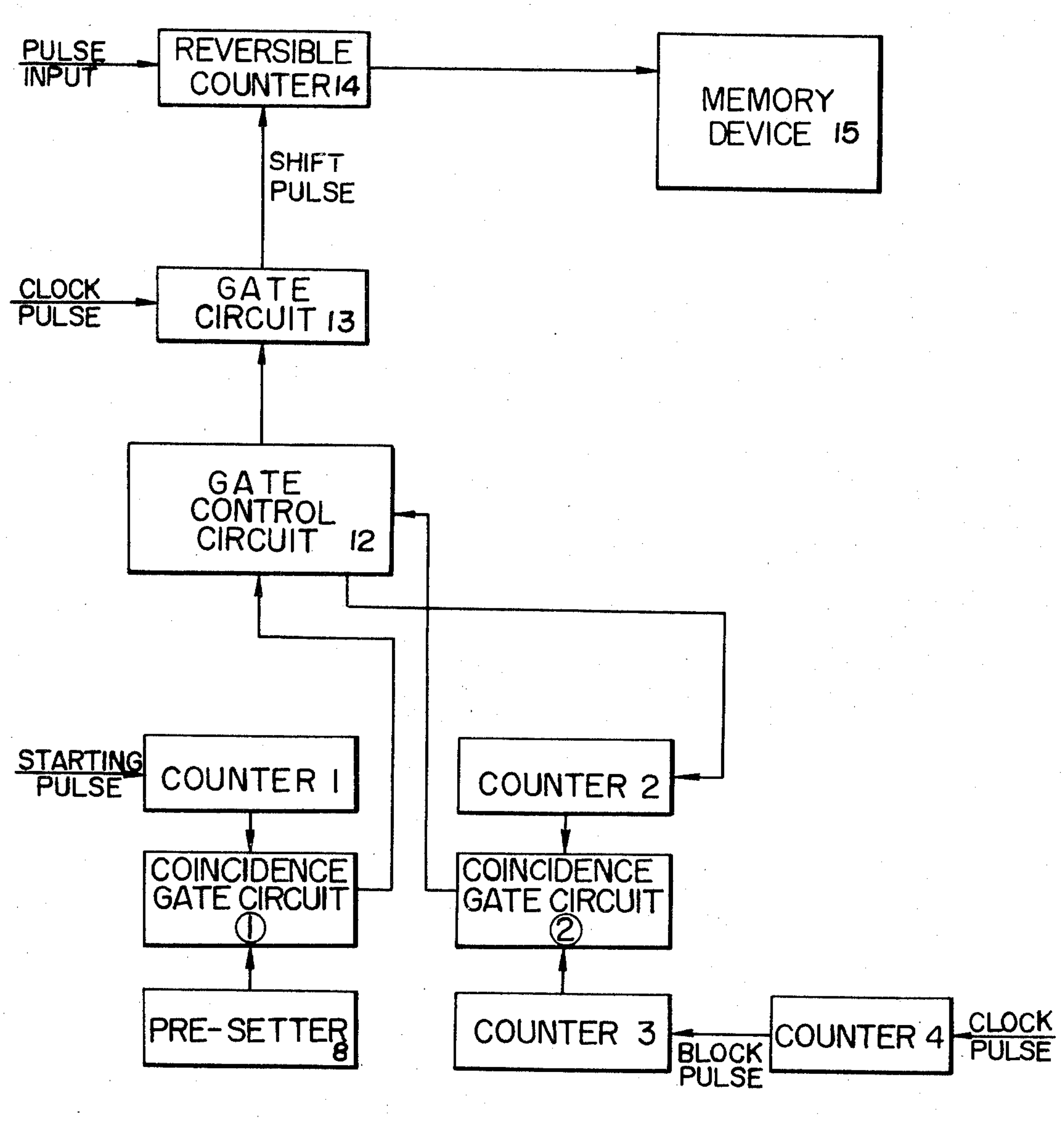
FIG. 7 is a block diagram thereof in a simplified form.

When the sampling period is enough long to the rotating period of the drum or when the frequency of the input pulse train is enough low, one rotating period of the drum may be selected so as to correspond to a minimum sampling period. In this case, there is the relation R pulse = T pulse = 1 pulse/rotation so that the portion encircled by the dotted line in FIG. 6 may be eliminated, thereby making such a simple block diagram circuit as shown in FIG. 7.

It is to be noted that when the capacity of the counter 1 is increased, the sampling period may be selected arbitrarily integral times as long as one revolution of the drum.

The above described block diagram for storing input informations in the memory device 15 may be used for reproduction.

Figure 8:
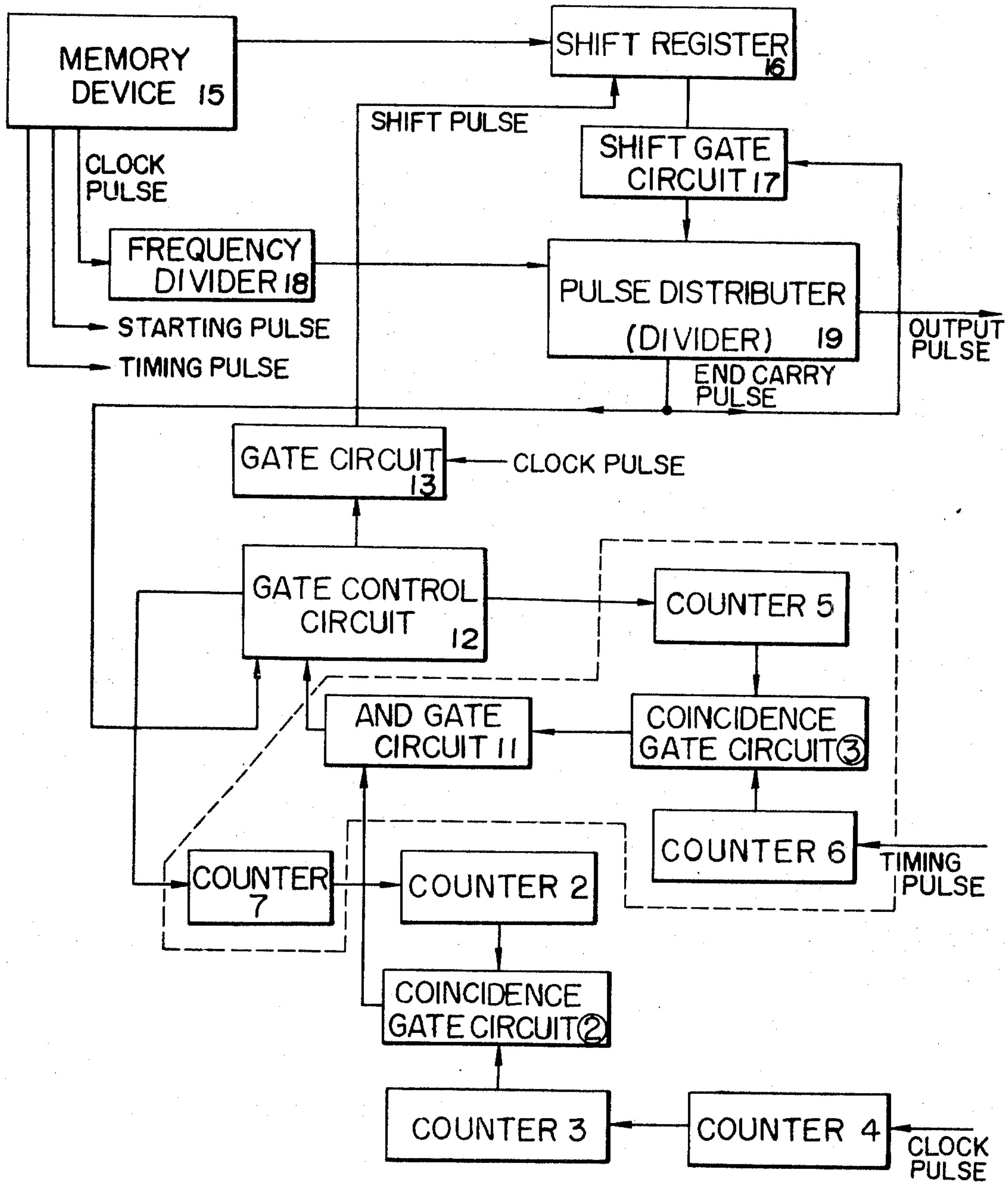
FIG. 8 is a block diagram of an information reproduction system in the device of the present invention.

FIG. 8 is a block diagram for reading out the informations stored in the memory device under the same conditions as these of the writing. When an end carry pulse representing the comoletion of a pulse distribution is derived from the pulse distributor (See FIG. 4), data previously read out in the shift register 16 from the memory device 15 are parallel-shifted through the shift gate register 17 to the registers (not shown) within the pulse distributor 19 and the pulse distribution corresponding to these data is started. Simultaneously the end carry pulse is applied to the gate control circuit 12. In this circuit one and gate pulse is formed as a pulse for reading out after arrival of the end carry pulse and applied to the gate circuit 13. Thereby, this circuit is opened and a clock pulse becomes a shift pulse to shift the next data in the memory device 15 to the shift register 16.

The above described operation is repeated so that the data may be sequentially converted into pulses. When one revolution of the drum is made coincident with a minimum sampling period (T pulse = R pulse = 1 pulse/rotation), the portion encircled by the dotted line in FIG. 8 may be eliminated, just as in the case of the block diagram in FIG. 6.

Figure 9:
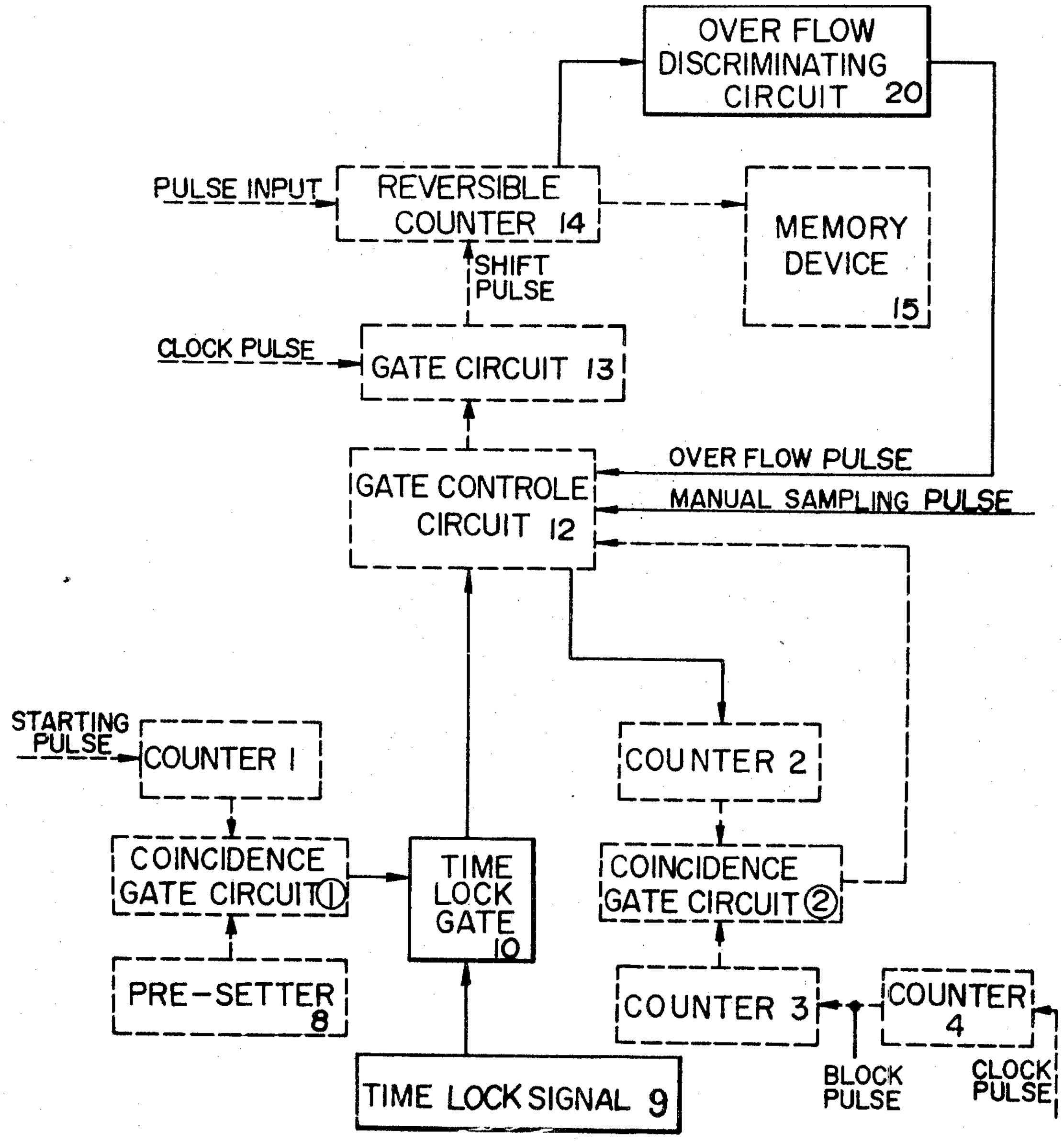
FIG. 9 is a block diagram of an information storage system in another embodiment of the present invention.

FIG. 9 is a block diagram consisting of the fundamental circuit of FIG. 7 shown by the dotted line blocks and additional circuits indicated by full lines. The fundamental circuit may of course be that of FIG. 6. In the fundamental circuit shown in FIG. 6, it occurs in practice that the maximum input frequency of pulses arriving as an input information becomes more than that of an allowable average one in a certain section of one operation process while a relatively slow input information is applied in the other sections, so that the reversible counter 14 may be overflowed partially even though its memory capacity is sufficient. That is, a writing operation in one section is limited by the input instruction pulse frequency (corresponding to the velocity of the motion) or the capacity of the reversible counter 14. Therefore, before the counter 14 is overflowed, it will be convenient if it can effect a writing into a memory device 15, independent ly of the normal sampling timing so that a required information may not be missed. For this purpose, an overflow discrimination circuit 20 is therefor provided in the reversible counter 14, according to the present invention. This circuit 20 is constructed to generate an overflow pulse when the number of input pulses in the counter 14 becomes a certain value. This value is determined by the condition that the counter 14 has not overflowed completely before completion of the writing-shifting, after the overflow pulse has been applied to the gate control circuit 12. The maximum of this value corresponds to the greatest capacity of the reversible counter 14. In the normal sampling period, the counter 14 is adjusted to have this greatest capacity. Thus, an pulse from the circuit 20 controls the gate control circuit 12 independently of the normal sampling, thereby enabling the writing into the memory device 15 as described above. That is, a coincidence pulse from the counter 2 and the counter 3 becomes a sampling pulse after arrival of the overflow pulse, thereby opening the gate circuit 13 and leading to a writing.

The manner of operation by a time lock gate 10 will be now described. In the fundamental circuit shown in FIG. 7, the so-called real time continuous path control is effected by the normal sampling. To this circuit is added the time lock gate 10, which is closed by a time lock signal 9 generated by operating a switch for the time lock gate on a control panel (not shown) attached to the device in the present invention so that the automatic normal sampling is stopped and the gate control circuit 12 remains closed unless an input information which causes an overflow of the reversible counter 14 arrives at it, thereby stopping the writing into the memory device 15. For example, in order to avoid a transient state at a terminal when an object is moved by the play back control, this object may be moved at the maximum speed toward a properly selected point in the vicinity of the terminal point and then subjected to a continuous path control in the last path between said selected point and the terminal point. In this case, the movement of the object may be made under a time locked condition except the path along which the object is subjected to the continuous path control, so that the writing may be enabled automatically only by overflow pulses in the time clocked state, preferably with the capacity of the reversible counter 14 being limited selectively in advance to store the information in the memory device 15 with an increased economy.

In the circuit shown in FIG. 9, the gate control circuit 12 is constructed to be controlled in any arbitrary timing by a manual sampling pulse which is generated by operating a switch for the manual sampling on a control panel (not shown) attached to the device in the present invention so that a point path control may be in addition to the continuous path control. Thus, it is possible to determine correctly important points for approximation of the initial or original motion with linear segments without any time limit, thereby improving an accuracy in positioning at the important points. Furthermore, since there is no time limit as described above, writing blocks to the memory device 15 may be sequentially used one by one so that an efficiency in utilizing the memory device with a limited capacity may be further increased. It is to be noted that the overflow writing under the use of reversible counter with the greatest capacity is possible also in the manual sampling writing, so that there is caused no special difficulty in the positioning.

The present invention has been described with particular reference to the embodiments thereof, but it should be understood that the variations and modifications may be made without departing from the true spirit of the present invention as described hereinabove and as defined in the appended claims.

What is claimed is:

1. A play back - machine control for storing in a binary coded form pulse trains representing the components of the coordinates to many-dimensional motion of a moving point together with the positive or negative direction of said motion, comprising a magnetic drum storing in advance clock pulses, timing pulses and starting pulses; a shiftable reversible counter adapted to have a suitably determined capacity and converting said pulse trains and the direction of said motion into binary digits; a gate circuit; a gate control circuit; a counter for counting said timing pulses from said magnetic drum, a presetter for setting in advance a minimum sampling period below one revolution of said drum and a coincidence gate circuit for generating first coincidence pulses on coincidence of the content of said counter with that set by said presetter; a first counter having a capacity equal to the number of the timing pulses stored in said drum and counting pulses from said gate control circuit, a second counter for counting the latter pulses, a third counter for generating block pulses every counting of said clock pulses from said drum, a fourth counter for counting said block pulses, and a coincidence gate circuit for generating second pulses on coincidence of the content of said second and fourth counters with one another; a fifth counter having a capacity equal to the number of said timing pulses stored in said drum and counting pulses from said gate control circuit, a sixth counter having the same capacity as said fifth and counting said timing pulses from said drum and a coincidence gate circuit for generating third coincidence pulses on coincidence of the content of said both counters with one another; and an and gate circuit for generating and gate pulses from said second and third coincidence pulses, wherein said first coincidence pulses are applied to said gate control circuit which generate new pulses in synchronism with completion of a writing into said drum and applies these pulses to said first and fifth counters, while said and gate pulses from said and gate circuit are applied to said gate control circuit which derives said and gate pulses one by one as sampling pulses every arrival of said first coincidence pulse to said gate control circuit and said sampling pulses are applied to said gate circuit to be opened, so that said clock pulses applied to this circuit from said drum become shift pulses and the content of binary digits in said reversible counter is shifted to said drum, t thereby effecting the writing therein.

2. A play back - machine control for storing in a binary code form pulse trains corresponding to the components of the coordinates to many-dimensional motion of a moving point together with the positive or negative direction of said motion, comprising a magnetic disk storing in advance clock pulses, timing pulses and starting pulses; a shiftable reversible counter adapted to have a suitably determined capacity and converting said pulse trains and the direction of said motion into binary digits; a gate circuit; a gate control circuit; a counter for counting said timing pulses from said magnetic disk, a presetter for setting in advance a minimum sampling period below one revolution of said disk, a coincidence gate circuit for generating first coincidence pulses on coincidence of the content of said counter with that set by said presetter; a first counter having a capacity equal to the number of the timing pulses stored in said disk and counting pulses from said gate control circuit, a second counter for counting the latter pulses, a third counter for generating block pulses every counting of said clock pulses from said disk, a fourth counter for counting said block pulses and an and gate circuit for generating second coincidence pulses on coincidence of said second and fourth counters with one another; a fifth counter having a capacity equal to the number of said timing pulses stored in said disk and counting pulses from said gate control circuit, a sixth counter having the same capacity as said fifth counter and counting said timing pulses from said disk and a coincidence gate circuit for generating third coincidence pulses on coincidence of the content of said both counters with one another; and an and gate circuit for generating and gate pulses from said second and third coincidence pulses, wherein said first coincidence pulses are applied to said gate control circuit which generate new pulses in synchronism with completion of a writing into said disk and applies these pulses to said first and fifth counters, while said and gate pulses from said and gate circuit are applied to said gate control circuit which derives said and gate pulses one by one as sampling pulses every arrival of said first coincidence pulses to said gate control circuit and said sampling pulses are applied to said gate circuit to be opened, so that said clock pulses applied to this circuit from said disk become shift pulses and the content of binary digits in said reversible counter is shifted to said disk, thereby effecting the writing therein.

3. A play back - machine control for storing in a binary coded form pulse trains corresponding to the components of the coordinates to many-dimensional motion of a moving point together with the positive or negative direction of said motion, comprising a magnetic drum storing in advance clock pulses, timing pulses and starting pulses; a shiftable reversible counter adapted to have a suitably determined capacity and converting said pulse trains and the direction of said motion in binary digits; a gate circuit; a gate control circuit; a counter for counting said timing pulses from said drum, a presetter for setting in advance a minimum sampling period to one revolution of said drum and an coincidence gate circuit or generating first coincedence pulses on coincidence of the content of said counter with that set by said presetter; a first counter for counting pulses from said gate control circuit, a second counter for generating block pulses every counting of clock pulses from said drum, a third counter for counting said block pulses and a coincidence pulses on coincidence of the coincidence of the content of said first and third counter, wherein said first coincidence pulses are applied to said gate control circuit which generate new pulses in synchronism with completion of a writing into said drum and applies these pulses to said first counter, while said second coincidence pulses are applied to said gate control circuit which forms said coincidence pulses one by one as sampling pulses every arrival of said first coincidence pulses to said gate control circuit and are applied to said gate circuit to be opened, so that said clock pulses applied to this circuit from said drum become shift pulses and the the content of binary digits in said reversible counter is shifted into said drum, thereby effecting writing therein.

4. A play back - machine control for storing in a binary coded form pulse trains corresponding to the components of the coordinates to many-dimensional motion of a moving point together with the positive or negative direction of said motion comprising a magnetic disk storing in advance clock pulses, timing pulses and starting pulses; a shiftable reversible counter adapted to have a suitably determined capacity and converting said pulse trains and the direction of said motion into binary digits; a gate circuit; a gate control circuit; a counter for counting said timing pulses from said magnetic disk, a presetter for setting in advance a minimum sampling period to one revolution of said disk and an coincidence gate circuit for generating first coincidence pulses on coincidence of the content of said counter with that set by said presetter; a first counter for counting pulses from said gate control circuit, a second counter for generating block pulses every counting of clock pulses from said disk, a third counter for counting said block pulses and a coincidence gate circuit for generating second coincidence pulses on coincidence of the content of said first counter and said third counter with one another, wherein said first coincidence pulses are applied to said gate control circuit which generate new pulses in synchronism with completion of a writing into said disk and applies these pulses to said first counter, while said second coincidence pulses are formed one by one as sampling pulses every arrival of said first coincidence pulses to said gate control circuit and are applied to said gate circuit to be opened, so that said clock pulses applied to this circuit from said disk become shift pulses and the content of binary digits in said reversible counter is shifted into said disk, thereby effecting the writing therein.

5. A play back - machine control according to claim 1 wherein said reversible counter is provided with an overflow discriminating circuit which is constructed to generate overflow pulses before said counter has been overflowed on completion of a writing-shifting in said drum so that these overflow pulses may control said gate control circuit independently of the normal sampling timing, thereby enabling the writing into said drum.

6. A play back - machine control according to claim 2 wherein said reversible counter is provided with an overflow discriminating circuit which is constructed to generate overflow pulses before said counter has been overflowed on completion of a writing-shifting in said disk, so that these overflow pulses may control said gate control circuit independently of the normal sampling timing, thereby enabling the writing into said drum.

7. A play back - machine control according to claim 3 wherein said reversible counter is provided with an overflow discriminating circuit which is constructed to generate overflow pulses before said counter has been overflowed on completion of a writing-shifting in said drum so that these overflow pulses may control said gate control circuit independently of the normal sampling timing, thereby enabling the writing into said disk.

8. A play back - machine control according to claim 4 wherein said reversible counter is provided with an overflow discriminating circuit which is constructed to generate overflow pulses before said counter has been overflowed on completion of a writing-shifting in said disk so that these overflow pulses may control said gate control circuit independently of the normal sampling timing, thereby enabling the writing into said disk.

9. A play back - machine control according to claim 5 wherein a time lock gate is connected to said gate control circuit and is adapted to be closed by a time lock signal to stop the normal sampling operation while said gate control circuit remains closed till arrival of the overflow pulses from said reversible counter adjusted to have a selectivity limited capacity, thereby enabling the writing into said drum by only said overflow pulses.

10. A play back - machine control according to claim 6 wherein a time lock gate is connected to said gate control circuit and is closed by a time lock signal to stop the normal sampling operation while said gate control circuit remains closed till arrival of pulses which causes the overflow pulses from said reversible counter adjusted to have a select-ivity limited capacity, thereby enabling the writing into said disk by only said overflow pulses.

11. A play back - machine control according to claim 7 wherein a time lock gate is connected to said gate control circuit and is closed by a time lock signal to stop the normal sampling operation while said gate control circuit remains closed till arrival of the overflow pulses of said reversible counter adjusted to have a selectivety limited capacity, ther thereby enabling the writing into said drum by only said overflow pulses.

12. A play back - machine control according to claim 8 wherein a time lock gate is connected to said gate control circuit and is closed by a time lock signal to stop the normal sampling operation while said gate control circuit remains closed till arrival of the overflow pulses of said reversible counter adjusted to have a selectivity limited capacity, thereby enabling the writing into said disk by only said overflow pulses.

13. A play back - machine control according to claim 9 wherein said gate control circuit is adapted to be controlled in any arbitrary timing by manual sampling pulses while stopping the normal sampling operation by closing said time lock gate and adjusting said reversible counter have the greatest capacity, thereby enabling the writing in said drum without any time limit.

14. A play back - machine control according to claim 10 wherein said gate control circuit is adapted to be controlled in any arbitrary timing by manual sampling pulses while stopping the normal sampling operation by closing said tim lock gate and adjusting said reversible counter to have the greatest capacity, thereby enabling the writing in said disk without any time limit.

15. A play back - machine control according to claim 11 wherein said gate control circuit is adapted to be controlled in any arbitrary timing by manual sampling pulses while stopping the normal sampling operation by closing said time lock gate and adjusting said reversible counter to have the greatest capacity, thereby enabling the writing in said disk without any time limit.

* * * * *